United States Patent Office 3,524,896
Patented Aug. 18, 1970

3,524,896
DIOLEFIN ALKYLATION PROCESS
John E. Bozik, Pittsburgh, Harold E. Swift, Gibsonia, and Ching Yong Wu, Pittsburgh, Pa., assignors to Goodrich-Gulf Chemicals, Inc., a corporation of Delaware
No Drawing. Filed Dec. 26, 1968, Ser. No. 787,226
Int. Cl. C07c 3/10, 11/12
U.S. Cl. 260—680          16 Claims

ABSTRACT OF THE DISCLOSURE

Process for alkylation of diolefins comprising reacting a diolefin and an olefin in contact with a catalyst system comprised of: (1) a cobalt salt, (2) an organometallic compound and (3) a 3,5-dioxa-1-phosphacyclohexane.

BACKGROUND OF THE INVENTION

Field of the invention

This invention relates to a process for alkylating diolefins, more specifically it relates to the alkylation of diolefins by reaction of such diolefins with olefins in contact with a specific catalyst system.

Diolefins are commercially interesting because of their widespread usage in the preparation of sulfur curable elastomers. Diolefin homopolymers and copolymers have found widespread usage in the elastomer field especially in tires, fabrics, shoes and other similar uses. Recently, terpolymers have received active attention, especially the ethylene propylene rubbers. Various syntheses have been developed to provide higher alkylated dienes useful as third comonomers for such rubbers.

It is an object of this invention to provide a process for alkylating diolefins in high conversions and selectivity.

It is another object of this invention to provide a highly specific catalyst system especially useful in the preparation of 1,4-diolefins by the reaction of 1,3-diolefins and an olefin.

It is still another object of this invention to provide alkylated diolefins useful as comonomers in terpolymer rubbers.

SUMMARY OF THE INVENTION

These and other objects are accomplished in accordance with the present invention which provides a process for the alkylation of diolefins which comprises reacting a diolefin with an olefin in contact with a catalyst system comprised of (1) a cobalt salt, (2) an organoaluminum compound having the formula $R_{3-n}AlX_n$ wherein R is an alkyl group containing from about 1 to about 10 carbon atoms, X is a halogen or hydrogen and n is a number from 0 to 2, and (3) a secondary phosphine ligand consisting at least in part of a 3,5-dioxa-1-phosphacyclohexane.

DESCRIPTION OF THE INVENTION

The diolefins which can be alkylated in accordance with the present invention are generally aliphatic and cycloaliphatic diolefin hydrocarbons, particularly the conjugated 1,3-diolefins such as butadiene-1,3, 1,3-pentadiene, 1,3-hexadiene, 2-chloro-1-, 3-butadiene, isoprene, piperylene, 2-phenyl-1,3-butadiene, 1,3-cyclohexadiene and other similar diolefins. Of particular interest is the alkylation of such readily available materials as butadiene, isoprene, and piperylene.

The olefins employed as the alkylating reactants can be straight chain aliphatic olefins or alpha olefins. For example, ethylene, propylene, butylene, styrene, alpha-methyl-styrene, tertiary butyl styrene, 4-methyl pentene-1, vinyl chloride, vinylidene chloride, perfluoroethylene, acrylonitrile, acrylic acid, methacrylic acid, methyl methacrylate, and other similar olefins.

The catalyst system is highly specific for alkylation of diolefins especially for the conversion of 1,3-diolefins to higher 1,4-diolefins. It has been found that inorganic cobalt salts, such as cobalt chloride, cobalt iodide, cobalt bromide, and the like are useful in the present invention. Surprisingly, other closely related inorganic salts, such as ferric chloride, nickel chloride and chromium chloride have been found to be ineffective for diolefin alkylation in this catalyst system.

The cobalt salts are reduced by organoaluminum compounds having the formula $R_{3-n}AlX_n$ wherein R is an alkyl group having from 1 to 10 carbon atoms, X is halogen or hydrogen, and n is a number from 0 to 2. Illustrative of such compounds are the trialkyl aluminums such as triethyl aluminum, tri-normal butyl aluminum, triisobutyl aluminum and the like; the alkyl aluminum halides, such as ethyl aluminum dichloride, n-butyl aluminum iodide, and the like; the alkyl aluminum dihalides, such as ethyl aluminum dichloride, n-butyl aluminum dibromide, isobutyl aluminum dichloride and the like; the alkyl aluminum sesquihalides, such as alkyl aluminum sesquiiodide and the like; and the organoaluminum hydrides such as diethyl aluminum hydride, di-normal butyl aluminum hydride and the like. It has been found that of the organoaluminum compounds described above, the trialkyl aluminum compounds are preferred with triethyl aluminum being most preferred.

The aluminum to cobalt molar ratio found useful in the present invention range from about 1.0 to about 4.0 and preferably range from about 2.0 to about 3.0. It has been found that both the selectivity and conversion to the alkylated diolefin pass through a maximum at an aluminum to cobalt molar ratio of about 2.5.

The secondary phosphine ligand which acts as a catalyst promoter in the catalyst system of the present invention is highly specific. The ligand, 3,5-dioxa-1-phosphacyclohexane, is represented by the structural formula:

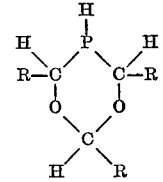

wherein R represents hydrogen and alkyl groups which can be the same or different containing from 1 to about 10 carbon atoms. Illustrative of such compounds are 2,4,6-triethyl - 3,5 - dioxa - 1 - phosphacyclohexane, 2,4,6- tri-normal propyl - 3,5 - dioxa-1-phosphacyclohexane, 2,4,6-triisopropyl - 3,5 - dioxa - 1-phosphacyclohexane, 2,4,6-tri-n-butyl - 3,5 - dioxa - 1 - phosphacyclohexane, 2,4,6-triisobutyl - 3,5 - dioxa-1-phosphacyclohexane, 2,4,6-tri-octyl-3,5-dioxa-1-phosphacyclohexane, 2-ethyl, 4-n-butyl, 6-n-butyl-3,5-dioxa-1-phosphacyclohexane, 3,5 - dioxa-1-phosphacyclohexane, and the like.

It has been found that other phosphines such as triphenyl phosphine, diphenyl phosphine, tri-normal butyl phosphine, tetraphenyl biphosphine and 1,2-bis (diphenylphosphino) ethane are not effective in the alkylation of diolefins, but instead give a wide variety of products. It has been found, however, that as long as the catalyst promoter is comprised at least in part of a 3,5-dioxa-1-phosphacyclohexane, other phosphines can be employed conjointly provided they are present in amounts less than about 90% by weight.

The molar ratio of the phosphine catalyst promoter to the cobalt salt ranges from about 0.5 to about 4.0 and preferably ranges from about 2.0 to about 3.0. It has been found that as the phosphines to cobalt molar ratio increases, both the selectivity and conversion of the alkylated diolefin increase.

The reaction is preferably conducted in an inert organic hydrocarbon solvent. Preferably the solvent is aromatic in nature such as benzene, toluene, and the like. Generally, the catalyst components are added to the solvent before introducing the reactants thereto although any order of addition can be employed without adverse effects. The entire reaction is preferably conducted under anhydrous conditions in an inert atmosphere such as nitrogen, argon, helium, and the like. The diolefin monomer concentration can vary with respect to the cobalt component of the catalyst in molar ratios of from about 25 to about 150 and preferably from about 50 to about 100. It has been found that as monomer concentration increases, conversion decreases and selectivity passes through a maximum at a molar ratio of monomer to cobalt of about 100.

The reaction is conducted at temperature which can vary over a rather broad range of from 0° to about 150° C. with temperatures of about 25° C. to 120° C. being preferred. It has been found that as the temperature increases, the conversion increases, however, the selectivity to the alkylated diolefin decreases at higher temperatures.

The system pressure can be conveniently controlled by the partial pressure of the olefin reactant. The system pressure can vary broadly from 100 to about 1,000 p.s.i. and preferably from about 200 to 500 p.s.i. It has been found that conversion increases at higher pressures although the selectivity decreases.

The following examples are for purposes of illustration only and are not to be construed as limiting the invention in any manner:

Example 1

To a 300 milliliter autoclave which has been thoroughly dried and purged with nitrogen was added 2 millimoles of cobalt chloride, 70 milliliters of toluene as solvent, 6 millimoles of 2,4,6 - triisopropyl-3,5-dioxa-1-phosphacyclohexane (TIDP), and 4 millimoles of triethyl aluminum (TEA). The autoclave and all reactants were kept under a nitrogen atmosphere at all times. To the catalyst-solvent mixture was added 200 millimoles of butadiene which had been pre-weighed. The autoclave was then pressurized to 50 p.s.i. with ethylene, heated to 110° C. and the final pressure adjusted to 200 p.s.i. with ethylene. The reaction was run for 3 hours after which time the autoclave was cooled and depressurized and the product was recovered. A conversion of 86% based on butadiene was obtained with a 92% selectivity to 1,4-hexadiene. Analysis of the recovered products indicated 92% 1,4 - hexadiene, 5% vinyl cyclohexene, 2% cyclooctadiene and 1% unknowns.

Confirmation of the obtainment of 1,4-hexadiene was obtained by infrared analysis which showed an absorption band at 1680–1620 cm.$^{-1}$ indicative of an isolated diene structure and also an absorption band at 1420–1410 cm.$^{-1}$ typical of a =CH$_2$ structure. The absorption band for a conjugated diene (about 1600 cm.$^{-1}$) was not present. Using a $\beta,\beta$-oxydiproprionitrile column, the retention time of the C$_6$ product was found to match that of 1,4-hexadiene but differed from those of 1,5-hexadiene, 2,4-hexadiene and 1,3-hexadiene. Nuclear magnetic resonance analysis also agreed with the structure $$CH_3CH=CHCH_2CH=CH_2$$

3H for CH$_3$ group, 2H for CH$_2$ group, 3H for =CH— group and 2H for =CH$_2$ group. Mass spectrographic analysis indicated an m/e value of 82 (major peak).

Example 2

Employing the procedure described in Example 1, several additional runs were made varying the temperature and reaction time to ascertain the effect of such parameters on the formation of the alkylated diolefin, 1,4-hexadiene. Table I summarizes the results obtained:

TABLE I.—EFFECT OF VARIATION OF TEMPERATURE AND REACTION TIME ON THE FORMATION OF 1,4-HEXADIENE

| Temp., °C. | Reaction time, hrs. | Conversion percent | Selectivity, percent |
|---|---|---|---|
| 90 | 2 | 35 | 85 |
| 90 | 6 | 59 | 90 |
| 100 | 6 | 80 | 92 |
| 110 | 2 | 83 | 92 |
| 110 | 6 | 88 | 92 |

Reaction conditions: 2 mmoles CoCl$_2$, 6 mmoles TIDP, 4 mmoles TEA, 200 mmoles butadiene, 70 ml. toluene, 200 p.s.i. total pressure.

Example 3

In a similar manner, various other phosphine ligands were compared to 2,4,6-triisopropyl-3,5-dioxa-1-phosphacyclohexane in the alkylation of butadiene with ethylene. Table II summarizes the results obtained:

TABLE II.—EFFECT OF VARIOUS PHOSPHINES AS LIGANDS FOR THE ALKYLATION OF BUTADIENE WITH ETHYLENE

| Ligand | Conversion, mole percent | Product selectivity, molar percent |
|---|---|---|
| 2,4,6-triisopropyl-3,5-dioxa-1-phosphacyclohexane. | 69 | 1,4-hexadiene, 79; 4-vinylcyclohexene, 15; cyclododecatriene, 6. |
| Triphenylphosphine | 43 | 4-vinylcyclohexene, 46; 1,5-cyclooctadiene, 37; 3-methyl-1,4-pentadiene, 3; 1-4-hexadiene, 2; unknown, 12. |
| Diphenylphosphine | 23 | 4-vinylcyclohexene, 48; 1,5-cyclooctadiene, 17; unknown, 13; 1,4-hexadiene, 9; n-decatriene, 13. |
| Tri-n-butylphosphine | 19 | 4-vinylcyclohexene, 38; 1,5-cyclooctadiene, 32; 3-methyl-1,4-pentadiene, 5; 1,4-hexadiene, 5; unknown, 25. |
| Tetraphenylbiphosphine | 96 | Methyl pentadiene, 59; 4-vinylcyclohexene, 24; 1,5-cyclooctadiene, 10; decatriene, 6; 1,4-hexadiene, 1. |
| 1,2-bis (diphenylphosphino) ethane. | 98 | Methyl pentadiene, 73; 1,4-hexadiene, 16; 4-vinylcyclohexene, 9; 1,5-cyclooctadiene, 1; n-decatriene, 1. |

Reaction conditions: TIDP/Co=3, 200 p.s.i. ethylene; Al/Co=2, 90° C., butadiene/Co=100, 2 hrs. reaction.

Example 4

In a similar manner to that described in Example 1, the alkylation of butadiene with ethylene was attempted using the identical catalyst system except that the cobalt salt was substituted with other closely related compounds, specifically, ferric chloride, nickel chloride, and chromium chloride. Table III summarizes the results obtained:

TABLE III.—EFFECT OF FERRIC CHLORIDE, NICKEL CHLORIDE, AND CHROMIUM CHLORIDE ON THE FORMATION OF 1,4-HEXADIENE

| Compound | Millimoles | Temp., °C. | Pressure, p.s.i. | Time, hours | Conversion, percent | Selectivity, percent [1] |
|---|---|---|---|---|---|---|
| FeCl$_3$ | 2 | 90 | 200 | 6 | 8 | 0 |
| NiCl$_2$ | 2 | 120 | 500 | 2 | 58 | 0 |
| CrCl$_3$ | 2 | 110 | 150 | 6 | 8 | 0 |

[1] To 1,4-hexadiene.
2,4,6-triisopropyl-3,5-dioxa-1-phosphacyclohexane, 6 moles; triethylaluminum, 4 millimoles.

Example 5

To a 300 milliliter autoclave which has been thoroughly dried and purged with nitrogen was added 2 millimoles of cobalt chloride, 70 milliliters of toluene as solvent, 6 millimoles of 2,4,6-triisopropyl-3,5-dioxa-1-phosphacyclohexane, and 4 millimoles of diethylaluminum chloride. The autoclave and all reactants were kept under a nitrogen atmosphere at all times. To the catalyst-solvent mixture was added 200 millimoles of butadiene which had been pre-weighed. The autoclave was then pressurized to 150 p.s.i. with ethylene heated to 110° C. and the final pressure adjusted to 500 p.s.i. with ethylene. The reaction was run for 6 hours after which time the autoclave was cooled and depressurized and the product was removed and analyzed by gas chromatography. A conversion of 39% was obtained with a selectivity to 1,4-hexadiene of 80%.

Example 6

In a manner similar to that described in Example 1, butadiene was alkylated with ethylene to form 1,4-hexadiene, except that a portion of the catalyst promoter was substituted with various amounts of triphenyl phosphine. Table IV summarizes the results obtained:

TABLE IV

| Ligand molar ratio | Temp., °C. | Pressure, p.s.i. | Time, hours | Conversion, percent | Selectivity, percent |
|---|---|---|---|---|---|
| TIDP/Ph₃P: | | | | | |
| 1/1 | 110 | 150 | 6 | 80 | 89 |
| 1/5 | 110 | 150 | 6 | 70 | 85 |

Example 7

To a 300 milliliter autoclave which has been throughly dried and purged with nitrogen was added 2 millimoles of cobalt chloride, 70 milliliters of toluene, 6 millimoles of 2,4,6-triisopropyl-3,5-dioxa-1-phosphacyclohexane and 4 millimoles of triethyl aluminum. The autoclave and all reactants were kept under a nitrogen atmosphere at all times. To the catalyst-solvent mixture was added 200 millimoles of isoprene. The autoclave was then pressurized to 150 p.s.i. with ethylene heated to 100° C. The reaction was run for 2 hours after which time the autoclave was cooled and depressurized and the product recovered. A conversion of 63% of the diolefin was obtained with a selectivity of 96% to a mixture of 4-methyl-1,4-hexadiene and 5-methyl-1,4-hexadiene.

What is claimed is:

1. Process for the alkylation of diolefins which comprises reacting a diolefin with a olefin in contact with a catalyst system comprising (1) a cobalt salt, (2) an organometallic compound having the formula $R_{3-n}AlX_n$ wherein R is an alkyl group containing from about 1 to about 10 carbon atoms, X is a halogen or hydrogen and n is a number from 0 to 2 and (3) a secondary phosphine ligand consisting at least in part of a 3,5-dioxa-1-phosphacyclohexane.

2. Process as defined in claim 1 wherein the organometallic compound and the cobalt salt are present in the catalyst system in Al/Co molar ratios ranging from about 1.0 about 4.0.

3. Process as defined in claim 2 wherein the Al/Co molar ratio ranges from about 2.0 to about 3.0.

4. Process as defined in claim 1 wherein the molar ratio of the secondary phosphine ligand to the cobalt salt ranges from about 0.5 to about 4.0.

5. Process as defined in claim 4 wherein the molar ratio of the secondary phosphine ligand to cobalt salt ranges from about 2.0 to about 3.0.

6. Process as defined in claim 1 wherein the reaction is conducted in an inert organic hydrocarbon solvent.

7. Process as defined in claim 1 wherein the reaction is conducted at temperatures ranging from about 0° C. to about 150° C.

8. Process as defined in claim 7 wherein the temperature ranges from about 25° C. to about 120° C.

9. Process as defined in claim 1 wherein the system pressure ranges from about 100 to about 1,000 p.s.i.

10. Process as defined in claim 1 wherein the molar ratio of diolefin monomer to cobalt salt ranges from about 25 to about 125.

11. Process as defined in claim 10 wherein the molar ratio of diolefin monomer to cobalt salt ranges from about 50 to about 100.

12. Process for the alkylation of diolefins which comprises reacting a diolefin with an olefin in contact with a catalyst system comprising (1) an inorganic cobalt salt, (2) a trialkyl aluminum compound and (3) a secondary phosphine ligand consisting at least in part of a 3,5-dioxa-1-phosphacyclohexane.

13. Process as defined in claim 12 wherein the inorganic cobalt salt is a cobalt halide.

14. Process as defined in claim 12 wherein the trialkyl aluminum is triethyl aluminum.

15. Process as defined in claim 12 wherein the phosphine ligand is comprised of a 3,5-dioxa-1-phosphacyclohexane and less than about 90% by weight of another phosphine.

16. Process for the alkylation of diolefins which comprises reacting a diolefin with an olefin in contact with a catalyst system comprising (1) a cobalt halide, (2) a trialkyl aluminum compound and (3) a 3,5-dioxa-1-phosphacyclohexane.

References Cited

UNITED STATES PATENTS 3,405,194  10/1968  Iwamoto et al. _____ 260—680
3,445,540   5/1969  Sarafidis _____ 260—680

PAUL M. COUGHLAN, JR., Primary Examiner

U.S. Cl. X.R.

252—429